US010005871B2

(12) United States Patent
Perez et al.

(10) Patent No.: US 10,005,871 B2
(45) Date of Patent: Jun. 26, 2018

(54) PROCESS OF PREPARING AN EMULSION CONTAINING CORE-SHEATH-SHELL POLYMER PARTICLES

(75) Inventors: Guillermo Perez, Vigo (ES); Sibel Altinok, Istanbul (TR)

(73) Assignee: ORGANIK KIMYA SANAYI VE TIC. A.S., Istanbul (TR)

( * ) Notice: Subject to any disclaimer, the term of this patent is extended or adjusted under 35 U.S.C. 154(b) by 451 days.

(21) Appl. No.: 13/355,462

(22) Filed: Jan. 20, 2012

(65) Prior Publication Data
US 2012/0245240 A1 Sep. 27, 2012

(51) Int. Cl.
| C08J 9/16 | (2006.01) |
| C08F 285/00 | (2006.01) |
| C08F 2/22 | (2006.01) |
| C09D 5/02 | (2006.01) |
| C09D 7/42 | (2018.01) |
| C09D 7/40 | (2018.01) |

(52) U.S. Cl.
CPC ............. *C08F 285/00* (2013.01); *C08F 2/22* (2013.01); *C09D 5/028* (2013.01); *C09D 7/42* (2018.01); *C09D 7/70* (2018.01)

(58) Field of Classification Search
CPC .......... C08F 2/22; C08F 285/00; C09D 5/028; C09D 7/005; C09D 7/1291
USPC .... 521/57, 82; 525/256, 263, 301, 902, 309, 525/50, 451; 428/402–402.24, 403, 404, 428/407, 321.1, 474.4; 427/331, 389.9, 427/212, 213–213.36, 483, 256; 264/534, 264/5, 41, 4–4.7; 424/400, 408, 450, 424/451, 455, 93.7, 184.1, 497, 489, 501, 424/490, 491, 492, 493, 494, 495
See application file for complete search history.

(56) References Cited

U.S. PATENT DOCUMENTS

| 2,460,976 A | 2/1949 | Church |
| 2,546,238 A | 3/1951 | Cadwallader |
| 2,574,020 A | 11/1951 | Crouch |
| 2,996,480 A | 8/1961 | Mulloy et al. |
| 3,036,053 A | 5/1962 | Doak |
| 4,021,400 A | 5/1977 | McKenna |
| 4,125,696 A | 11/1978 | Kamath |
| 4,139,697 A | 2/1979 | Sidi |
| 4,147,845 A | 4/1979 | Peterson |
| 4,247,434 A | 1/1981 | Lovelace et al. |
| 4,301,264 A | 11/1981 | Moore et al. |
| 4,419,466 A | 12/1983 | Hopkins |
| 4,427,836 A | 1/1984 | Kowalski |
| 4,468,498 A | 8/1984 | Kowalski |
| 4,469,825 A | 9/1984 | Kowalski |
| 4,503,219 A | 3/1985 | Reffert et al. |
| 4,594,363 A | 6/1986 | Blankenship et al. |
| 4,649,098 A | 3/1987 | Takeda |
| 4,677,003 A | 6/1987 | Redlich et al. |
| 4,737,577 A | 4/1988 | Brown |
| 4,798,691 A | 1/1989 | Kasai et al. |
| 4,829,102 A | 5/1989 | Biale |
| 4,863,973 A | 9/1989 | Chip et al. |
| 4,880,842 A | 11/1989 | Kowalski et al. |
| 4,910,229 A | 3/1990 | Okubo |
| 4,920,160 A | 4/1990 | Chip et al. |
| 4,970,241 A | 11/1990 | Kowalski et al. |
| 5,036,109 A | 7/1991 | Chip et al. |
| 5,041,464 A | 8/1991 | Hoshino et al. |
| 5,064,744 A | 11/1991 | Fukui et al. |
| 5,077,320 A | 12/1991 | Touda et al. |
| 5,157,084 A * | 10/1992 | Lee et al. ..................... 525/301 |
| 5,216,044 A | 6/1993 | Hoshino et al. |
| 5,229,209 A | 6/1993 | Gharapetian et al. |
| 5,225,279 A | 7/1993 | Redlich et al. |
| 5,273,824 A | 12/1993 | Hoshino et al. |
| 5,290,888 A | 3/1994 | Gatechair et al. |
| 5,292,660 A | 3/1994 | Overbeek et al. |
| 5,360,827 A | 11/1994 | Toda et al. |
| 5,494,971 A | 2/1996 | Blankenship |
| 5,510,422 A | 4/1996 | Blankenship et al. |
| 5,521,253 A | 5/1996 | Lee et al. |
| 5,545,695 A | 8/1996 | Blankenship |
| 5,583,247 A | 12/1996 | Nesvadba et al. |
| 5,618,888 A | 4/1997 | Choi et al. |
| 5,639,805 A | 6/1997 | Park et al. |
| 5,834,526 A | 11/1998 | Wu et al. |
| 5,888,356 A | 3/1999 | Keil et al. |
| 5,973,107 A | 10/1999 | Margotte et al. |

(Continued)

FOREIGN PATENT DOCUMENTS

| DE | 69021947 T2 | 2/1996 |
| EP | 0186926 A2 | 7/1986 |

(Continued)

OTHER PUBLICATIONS

International Preliminary Report on Patentability, Application No. PCT/EP2012/001189, dated Apr. 12, 2013.
International Search Report of EP 11002327.2-2109.
Office Action, dated Oct. 7, 2014 from the Japanese Patent Office.
F.A. Bovey and I.M. Kolthoff, Inhibition and Retardation of Vinyl Polymerization, 42 Chem. Rev. 491 (1948).
I. Capek, Effect of Hydroquinone on the Kinetics of Emulsion Polymerization of Butyl Acrylate, 43 Chem. Papers 527, 527-28 (1989).

(Continued)

*Primary Examiner* — Irina S Zemel
(74) *Attorney, Agent, or Firm* — McDonald Hopkins LLC

(57) ABSTRACT

The disclosure relates to processes for preparing an emulsion containing core-sheath-shell polymer particles which, when dried, contain a microvoid which causes opacity in compositions in which they are contained. The particles can serve as binding or opacifying agents in paints, coating, impregnating, and molding compositions primarily, also extended to paper coatings and to some extent in leather, textiles and water based construction materials.

16 Claims, No Drawings

(56) References Cited

U.S. PATENT DOCUMENTS

| | | |
|---|---|---|
| 6,020,435 A | 2/2000 | Blankenship et al. |
| 6,139,961 A | 10/2000 | Blankenship et al. |
| 6,184,300 B1 | 2/2001 | Shimokawa et al. |
| 6,235,810 B1 | 5/2001 | Pavlyuchenko et al. |
| 6,252,004 B1 | 6/2001 | Blankenship et al. |
| 6,632,531 B2 | 10/2003 | Blankenship |
| 6,673,451 B2 | 1/2004 | Bardman et al. |
| 6,784,262 B2 | 8/2004 | Blankenship |
| 6,896,905 B2 | 5/2005 | Blankenship et al. |
| 7,435,783 B2 | 10/2008 | Blankenship et al. |
| 7,629,414 B2 | 12/2009 | Bardman et al. |
| 7,691,942 B2 | 4/2010 | Bardman et al. |
| 7,803,878 B2 | 9/2010 | Blankenship et al. |
| 2009/0156701 A1* | 6/2009 | Josep Heuts et al. .......... 521/57 |

FOREIGN PATENT DOCUMENTS

| | | |
|---|---|---|
| EP | 0404184 A2 | 12/1990 |
| JP | H05263394 A | 10/1993 |
| JP | H05279409 A | 10/1993 |
| JP | H06248012 A | 9/1994 |
| JP | H07102024 A | 4/1995 |
| JP | H07102025 A | 4/1995 |
| JP | H08500621 A | 1/1996 |
| JP | H08165351 A | 6/1996 |
| JP | 2005187709 A | 7/2005 |
| JP | 2007056259 A | 3/2007 |
| JP | 2009144029 A | 7/2009 |
| JP | 2011046861 A | 3/2011 |
| WO | 9511265 A1 | 4/1995 |
| WO | 2005071014 A1 | 8/2005 |

OTHER PUBLICATIONS

Vanderhoff et al., Preparation of Particles for Microvoid Coatings by Seeded Emulsion Polymerization, in Polymer Latexes, Ch. 17 (E. Daniels ed. 1992).

S.M. Malmonge and L.R. Santos, Emergency Stopper for VCM Suspension Polymerization, 2 J. Vinyl & Additive Tech. 211 (1996).

F. Tudos and T. Foldes-Bereznich, Free-Radical Polymerization: Inhibition and Retardation, 14 Prog. Polym. Sci. 717 (1989).

Buruaga et al., On-Line Calorimetric Control of Emulsion Polymerization Reactors, 51 Chem. Eng'g Sci. 2781 (1996).

Matsas et al., Removal of Polymerization Inhibitors from Styrene Based on Adsorption, 227 Die Angewandte Makromolekulare Chemie 35 (1995).

Kammel et al., Control of Runaway Polymerization Reactions by Injection of Inhibiting Agents—A Contributino to the Safety of Chemical Reactors, 51 Chem. Eng'g Sci. 2253 (1996).

Adachi et al., Diluent Effects on Molecular Motions and Glass Transition in Polymers, 13 J. Polymer Sci. 2155 (1975).

Aranchibia et al., Mechanism of Vinyl Monomer Polymerization in the Presence of Trialkylboranes and Inhibitors, 7 J. Polymer Sci. 3430 (1969).

Araujo et al., Techniques for Reducing Residual Monomer Content in Polymers: A Review, 42 Polymer Eng'g & Sci. 1442 (2002).

Dissertation: J.M. Park, Structured Latex Particles with Hydrophilic Polymer Cores, Lehigh University (1989).

\* cited by examiner

PROCESS OF PREPARING AN EMULSION CONTAINING CORE-SHEATH-SHELL POLYMER PARTICLES

The present disclosure relates to processes of preparing an emulsion containing core-sheath-shell polymer particles which, when dried, contain a microvoid which causes opacity in compositions in which they are contained. The particles can serve as binding or opacifying agents in paints, coating, impregnating, and molding compositions primarily, also extended to paper coatings and to some extent in leather, textiles and water based construction materials.

U.S. Pat. No. 4,594,363 discloses a process for making core-sheath polymer particles containing voids, said particles useful for opacifying, comprising (A) emulsion polymerization a core from a core monomer system comprised of at least one ethylenically unsaturated monomer containing acid functionality; (B) encapsulating said core with a hard sheath by emulsion polymerizing a sheath monomer system in the presence of said core, said sheath permitting penetration of fixed or permanent bases; and (C) swelling at elevated temperature the resultant core-sheath polymer particles with fixed or permanent base so as to produce a dispersion of particles which, when dried, contain a microvoid which causes opacity in compositions in which they are contained, provided that either (1) said sheath comprises at least about 1% acid functional monomer or (2) said swelling takes place in the presence of solvent.

U.S. Pat. No. 4,920,160 describes the use of fixed bases like sodium and potassium hydroxide but differs from U.S. Pat. No. 4,594,363 in that neither acid in sheath/shell steps, nor solvent to help swelling of the core are needed.

The most extensive technology jump in said field of core-sheath polymeric opacifying particles is reflected in U.S. Pat. No. 6,020,435. The polymeric opacifying particles disclosed therein exhibit much higher opacity values (at about 8-10) than those resulting from the process disclosed in U.S. Pat. No. 4,594,363 (at about 1-3). The process of U.S. Pat. No. 6,020,435 provokes a major depletion in free radicals contained in the medium before the swelling additions are performed, said depletion being obtained by the addition of an effective amount of polymerization inhibitors such as N,N-diethylhydroxylamine, N-nitrosodiphenylamine, 2,4-dinitrophenylhydrazine, p-phenylenediamine, phenathiazine, alloocimene, triethyl phosphite, 4-nitrosophenol, 2-nitrophenol, p-aminophenol, 4-hydroxy-TEMPO (also known as 4-hydroxy-2,2,6,6, tetramethylpiperidinyloxy, free radical), hydroquinone, p-methoxyhydroquinone, tert-butyl-p-hydroquinone, 2,5-di-tert-butyl-p-hydroquinone, 1,4-naphthalenediol, 4-tert butyl catechol, copper sulfate, copper nitrate, cresol and phenol. Almost all examples given in U.S. Pat. No. 6,020,435 use 4HT (4-hydroxy-2,2,6,6, tetramethyl-piperidinyloxy), a sophisticated living radical, though a stable solid material when stored at temperatures below 5-8° C.

Apart from toxicity and even mutagenic hazards involved when using those chemicals, they are all quite expensive materials. Moreover, the use of such polymerization inhibitors like 4-hydroxy-TEMPO requires undesired manual operations, including the preparation of a fresh solution of the solid inhibitor material by manually dissolving the material and pouring it into the reaction vessel. Therefore, the high opacity values of the resulting opacifying particles are obtained on account of using intricate, toxic, expensive chemical compounds and undesired operations besides the actual reaction vessel.

It is therefore an object of the present disclosure to provide processes of preparing core-sheath-shell opacifying polymeric particles having at least the same or comparable performances like those particles disclosed by the process of U.S. Pat. No. 6,020,435, in particular similar opacity values, in which those particles should not have the odor problems associated with the use of volatile base swelling agents, should be obtained without using such intricate, toxic, expensive chemical compounds, in particular without such polymerization inhibitors, and are obtainable in a safer and much more efficient and thus cheaper way than those of U.S. Pat. No. 6,020,435.

This object and others which will become apparent from the following disclosure are achieved by the present disclosure which relates to processes of preparing an emulsion containing core-sheath-shell polymer particles which, when dried, contain a microvoid which causes opacity in compositions in which they are contained, without using any polymerization inhibitors or scavengers, i.e. excluding the use of any polymerization inhibitors or scavengers, said particles being useful as opacifying agents, said process comprising the steps of:

(i) emulsion polymerizing a core (A) from a core monomer system comprising, as polymerized units, from 5 to 100 percent by weight, based on the weight of the core, of hydrophilic monoethylenically unsaturated monomer containing acid functionality, and from 0 to 95 percent by weight, based on the weight of the core, of at least one nonionic monoethylenically unsaturated monomer;

(ii) encapsulating said core (A) with a sheath polymeric layer (B) by emulsion polymerizing a sheath monomer system (E1) comprising, as polymerized units, at least 20% by weight, preferably at least 40% by weight, of a hydrophilic monoethylenically unsaturated monomer, at least 20% by weight, preferably at least 40% by weight, of a hydrophobic monoethylenically unsaturated monomer, and 1% to 20% by weight of a hydrophilic monoethylenically unsaturated monomer containing acid functionality, each based on the total weight of the sheath polymeric layer, in the presence of said core, said sheath permitting penetration of volatile, fixed or permanent bases;

(iii) encapsulating said core-sheath particles with a polymeric shell (C) by emulsion polymerizing a shell monomer system (E2) comprising, as polymerized units, from 1 to 10 percent by weight, of hydrophilic monoethylenically unsaturated monomer containing acid functionality, and from 90 to 99 percent by weight, of at least one nonionic monoethylenically unsaturated monomer, each based on the total weight of the polymeric shell;

(iv) neutralizing and swelling at elevated temperature the resultant core-sheath-shell polymer particles with a volatile, fixed or permanent base, said swelling taking place in the presence of a monomer-solvent-system comprising from 5-50% by weight of the at least one nonionic monoethylenically unsaturated monomer of said shell monomer system (E2), said monomer acting as a solvent, which, in turn, assists in the penetration of the base through the created polymer layers down to the core, wherein said monomer-solvent-system can be added before, after or during the addition of the base, and (v) after the swelling step, reducing the level of said at least one nonionic monoethylenically unsaturated monomer of said monomer-solvent-system in step (iv) by polymerizing the monomer to less than 10,000 ppm, based on polymer solids, so as to produce an emulsion of particles which, when dried, contain a microvoid which causes opacity in compositions in which they are contained, wherein a water soluble polymerization catalyst in a total amount of 0.05 to 0.45% by weight, based on the total amount of monomers in E1 plus E2, is either fed in parallel with the sheath monomer system E1 into the polymerization reactor or is fed into the polymerization reactor before, e.g. right before, emulsion polymerization of E1 in step (ii) starts.

The present disclosure further relates to an emulsion containing said core-sheath-shell polymer particles obtained by the above process, and to core-sheath-shell polymer particles containing voids, obtained by at least partially drying said emulsion. The swollen core-sheath-shell polymer particles contain voids which, when the particles are in the form of an aqueous emulsion, are filled with liquid water. On drying the voids become filled with air, thus conferring on the particles their opacifying properties.

The main polymerization reaction according to the present disclosure resides in encapsulating the acidic, alkali swellable core polymer (or seed) with a sheath that serves as a bridge to further encapsulate said core-sheath with a shell. In accordance with the present disclosure, a catalyst, within certain tailored limits, is dosed together with sheath monomer system E1 or shot-in before, e.g. right before, E1 addition starts and that catalysts is all and the only catalyst present in reacting the monomer systems E1 and E2, with no further catalysts being added or shot at any moment of the reaction after that catalyst has been added. Thus, no inhibitors or scavengers are added at any moment of the whole reaction from beginning to end. To that extent, reacting or not said at least one nonionic monoethylenically unsaturated monomer of said monomer-solvent-system in step (iv), preferably styrene monomer, that has acted as solvent in the swelling step, is not a fundamental part of the process for preparing the polymeric particles as such.

If the polymerization process is run according to the present disclosure, after the monomer systems E1 (sheath) and E2 (shell) have been polymerized within the given ranges, then both the monomer-solvent-system, preferably styrene monomer, and the swelling neutralizing agent (preferably NaOH, KOH) are present together in order to perform the swelling of particles by neutralizing the core. If one of them is not present, no swelling takes place and, consequently, no opacifying properties are developed. But if both are present, the shell becomes permeable to the base which can diffuse through the shell and the sheath, neutralizing the core, provoking its expansion, and thus the particles swell. As mentioned, in step (iv) the monomer-solvent-system can be added before, after or during the addition of the base.

Usually, the swollen particles have a diameter from about 300 nm to about 1000 nm, depending on the intended application (paints, paper, etc.). When used as opacifying agent for paints, diameters from about 300 nm to 500 nm are optionally chosen in various exemplary embodiments. If this product is dried, water will evaporate as free monomer of the monomer-solvent-system, preferably styrene monomer, also will, and an opacifying agent is obtained which has all desired properties. When not performing above step (v), the product smells of monomer, i.e. styrene, which of course is not desired. Therefore, in step (v) at the end of the process, free monomer which "smells", is removed by polymerization. Therefore, when setting the limits for catalyst amounts, surfactant amounts, ratio core-to-shell, level of functional acid monomer, etc., it is always referred to these amounts as a percentage on monomers in the monomer systems E1+E2, or, in other words, "based on (actual) monomers to be polymerized" (i.e. monomers present in E1+E2).

The process of the present disclosure differs from that of U.S. Pat. No. 4,594,363 at least in the following points:

- total amount of water soluble polymerization catalyst in the range of 0.05 to 0.45% by weight, based on the total amount of monomers in E1 plus E2, the catalyst being either fed in parallel with the sheath monomer system E1 into the polymerization reactor or is fed into the polymerization reactor before, e.g. right before, emulsion polymerization of E1 in step (ii) starts, while U.S. Pat. No. 4,594,363 uses in Examples 2A to 3E catalyst amounts of 1.42% by weight, calculated as percentage on monomers to be polymerized, and the catalyst are also dosed with the shell monomer supply;
- the sheath monomer system of U.S. Pat. No. 4,594,363 does not mandatorily provide for comprising, as polymerized units, at least 20% by weight of a hydrophilic monoethylenically unsaturated monomer, at least 20% by weight of a hydrophobic monoethylenically unsaturated monomer, and 1% to 20% by weight of a hydrophilic monoethylenically unsaturated monomer containing acid functionality, each based on the total weight of the sheath polymeric layer; instead a system of 20% by weight butyl (meth)acrylate, 80% by weight methyl (meth)acrylate plus acid is adopted;
- the shell monomer system (E2) for making up the polymeric shell (C) mandatorily comprises hydrophilic monoethylenically unsaturated monomer containing acid functionality, while none of the Examples of U.S. Pat. No. 4,594,363 do;
- the process of the present disclosure provide for opacifying particles with high opacity values of between 8 to 10, while the particles obtained by U.S. Pat. No. 4,594,363 show much lesser opacity values, i.e. between 1 to 3.

By refining certain process parameters, the process of the present disclosure is capable of producing swollen multistage emulsion polymers having much higher opacity values as those obtained by the process of U.S. Pat. No. 4,594,363.

The process of the present disclosure differs from that of U.S. Pat. No. 6,020,435 at least in the following points:

- no use at all of any polymerization inhibitors or scavengers;
- total amount of water soluble polymerization catalyst in the range of 0.05 to 0.45% by weight, based on the total amount of monomers in E1 plus E2, the catalyst being either fed in parallel with the sheath monomer system E1 into the polymerization reactor or is fed into the polymerization reactor before, e.g. right before, emulsion polymerization of E1 in step (ii) starts, while in U.S. Pat. No. 6,020,435 uses in Examples 17 to 49 catalyst amounts between 0.64 and 1.33% by weight, calculated as percentage on monomers to be polymerized, and the catalyst are also dosed with the shell monomer supply;
- the sheath monomer system of U.S. Pat. No. 6,020,435 does not mandatorily provide for comprising, as polymerized units, at least 20% by weight of a hydrophilic monoethylenically unsaturated monomer, at least 20% by weight of a hydrophobic monoethylenically unsaturated monomer, and 1% to 20% by weight of a hydrophilic monoethylenically unsaturated monomer containing acid functionality, each based on the total weight of the sheath polymeric layer; instead a system of 9% by weight butyl (meth)acrylate, 89% by weight methyl (meth)acrylate plus 2% by weight of (meth) acrylic acid is adopted;

the shell monomer system (E2) for making up the polymeric shell (C) mandatorily comprises hydrophilic monoethylenically unsaturated monomer containing acid functionality, while none of the Examples of U.S. Pat. No. 6,020,435 do.

By refining certain process parameters, the process of the present disclosure is capable of producing swollen multi-stage emulsion polymers having opacity values as high as those obtained by the process of U.S. Pat. No. 6,020,435, however avoiding the use of intricate, toxic, expensive chemical compounds, in particular not using any polymerization inhibitors or scavengers. The overall process of the present disclosure is much more efficient and cheaper than that of U.S. Pat. No. 6,020,435.

"Emulsion polymer", as used herein, refers to a water-insoluble polymer which is prepared by emulsion polymerization techniques.

"Polymer emulsion", as used herein, refers to an aqueous composition having discrete, water-insoluble polymer particles dispersed therein.

As used herein, acrylate and methacrylate are referred to as "(meth)acrylate," acrylic acid and methacrylic acid are referred to as "(meth)acrylic acid."

The stages of the multi-stage polymer particles of the present disclosure include core stage polymer (A), sheath stage polymer (B), and shell stage polymer (C). The core, sheath and shell may themselves be comprised of more than one stage. The core of the multi-stage polymers of the present disclosure are emulsion polymers comprising, as polymerized units, from 5 to 100 percent by weight, based on the weight of the core, of at least one hydrophilic monoethylenically unsaturated monomer containing acid functionality, and from 0 to 95 percent by weight, based on the weight of the core stage polymer, of at least one nonionic monoethylenically unsaturated monomer.

Cores containing at least five percent by weight, based on the total weight of the core polymer, of at least one hydrophilic monoethylenically unsaturated monomer containing acid functionality will generally result in a suitable degree of swelling. Preferably, the core comprises, as polymerized units, hydrophilic monoethylenically unsaturated monomer containing acid functionality at a level of from 5 to 100, more preferably, from 20 to 60, and most preferably, from 30 to 50 percent by weight based on the total weight of the core. The hydrophilic core polymer may be made in a single stage or step of the sequential polymerization or may be made by a plurality of steps in sequence.

Suitable hydrophilic monoethylenically unsaturated monomers containing acid-functionality useful for making the core polymer include monoethylenically unsaturated monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. Acrylic acid and methacrylic acid are chosen in various embodiments.

Suitable nonionic monoethylenically unsaturated monomers for making the hydrophilic core polymer include styrene, α-methyl styrene, p-methyl styrene, t-butyl styrene, vinyltoluene, ethylene, vinyl acetate, vinyl chloride, vinylidene chloride, (meth)acrylonitrile, (meth)acrylamide, ($C_1$-$C_{20}$) alkyl or ($C_3$-$C_{20}$) alkenyl esters of (meth)acrylic acid, such as methyl (meth)acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, oleyl (meth)acrylate, palmityl (meth)acrylate, stearyl (meth)acrylate and the like.

In an exemplary embodiment of the disclosure, the core (A) is polymerized from a core monomer system comprising 30-40% by weight (meth)acrylic acid and 60-70% by weight methyl (meth)acrylate.

The core, whether obtained by a single stage process or a process involving several stages, has an average particle size of from 50 nm to 300 nm, preferably from 100 nm to 250 nm, diameter in unswollen condition. If the core is obtained from a seed polymer, the seed polymer preferably has an average particle size of from 30 nm to 100 nm.

The multi-stage polymer particles of the present disclosure contain an intermediate stage, i.e. a sheath polymeric layer (B). The sheath polymeric layer (B) partially or fully encapsulates the core (A) and itself is partially or fully encapsulated by the shell (C). The sheath polymeric layer (B) is prepared by conducting an emulsion polymerization in the presence of the core.

The hydrophilic monoethylenically unsaturated monomers containing acid functionality and the nonionic monoethylenically unsaturated monomers useful for making the core are also useful for making the sheath polymeric layer.

Preferably, the sheath polymeric layer is polymerized from a sheath monomer system (E1) comprising at least 20% by weight, more preferably at least 40% by weight, of styrene, at least 20% by weight, more preferably at least 40% by weight, of methyl (meth)acrylate, and 1% to 20% by weight of (meth)acrylic acid.

Usually, the sheath monomer system (E1) is polymerized at least to about 90% before the shell monomer system (E2) begins to be polymerized. The total amount of sheath polymeric layer (B) is by weight from 1 to 5 times the weight of the core. The core-sheath particle after step (ii) whether obtained by a single stage process or a process involving several stages, has usually an average particle size of from 100 nm to 300 nm, preferably from 150 nm to 250 nm, diameter in unswollen condition.

The shell (C) of the multi-staged polymer of this disclosure is the product of emulsion polymerizing a shell monomer system (E2) comprising, as polymerized units, from 1 to 10 percent by weight, of hydrophilic monoethylenically unsaturated monomer containing acid functionality, and from 90 to 99 percent by weight, of at least one nonionic monoethylenically unsaturated monomer, each based on the total weight of the polymeric shell.

The nonionic monoethylenically unsaturated monomers suitable for the core are also suitable for the shell. Styrene may be chosen in at least certain exemplary embodiments. The shell also contains, as polymerized units, from 1 to 10, preferably from 1 to 5, percent by weight based on the weight of the shell, of one or more monoethylenically unsaturated monomers containing acid-functionality including acrylic acid, methacrylic acid, acryloxypropionic acid, (meth)acryloxypropionic acid, itaconic acid, aconitic acid, maleic acid, maleic anhydride, fumaric acid, crotonic acid, monomethyl maleate, monomethyl fumarate, monomethyl itaconate and the like. Acrylic acid and methacrylic acid may be chosen in various exemplary embodiments.

The shell may also optionally contain less than 20 percent by weight, preferably from 0.1 to 3 percent by weight, based on the total weight of the shell, of polyethylenically unsaturated monomer like alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of $\alpha,\beta$-unsaturated mono- and dicarboxylic acids having terminal ethylenic unsaturation including allyl methacrylate, allyl acrylate, diallyl maleate, diallyl fumarate, diallyl itaconate and the like.

In an exemplary embodiment of the present disclosure, the shell monomer system (E2) comprises, as polymerized units, from 1 to 10 percent by weight, of (meth)acrylic acid, and from 90 to 99 percent by weight, of styrene.

The core-sheath-shell particle after step (iii) whether obtained by a single stage process or a process involving several stages, has usually an average particle size of from 250 nm to 1000 nm, diameter in unswollen condition. When intended for use as opacifying agent for paints, an average particle size of from 300 nm to 450 nm is preferable.

The presence of acid-functional monoethylenically unsaturated monomer in the shell (C) may serve several functions:
(1) stabilizing of the final multi-stage emulsion polymer particle; and
(2) compatibilizing the shell with the previously formed stage of the multistage emulsion polymer particle.

As used herein, the term "sequentially emulsion polymerized" or "sequentially emulsion produced" refers to polymers (including homopolymers and copolymers) which are prepared in aqueous medium by an emulsion polymerization process in the presence of the dispersed polymer particles of a previously formed emulsion polymer such that the previously formed emulsion polymers are increased in size by deposition thereon of emulsion polymerized product of one or more successive monomer charges introduced into the medium containing the dispersed particles of the preformed emulsion polymer.

Exemplary methods of this disclosure contemplate that the core, the sheath polymeric layer, and/or the shell may be made in a single stage or step of the sequential polymerization, or may be made by a plurality of steps in sequence following the polymerization.

According to the present disclosure, a water soluble polymerization catalyst in a total amount of 0.05 to 0.45% by weight, based on the total amount of monomers in E1 plus E2, is employed. When performing the process of the present disclosure on an industrial scale, i.e. in reactors with capacities of about 10 000 to 50 000 kg, the water soluble polymerization catalyst is preferably employed in a total amount of 0.10 to 0.30 by weight, based on the total amount of monomers in E1 plus E2. The reason for that resides in the enhanced efficiency of such catalysts under real plant conditions when compared to their employment under laboratory conditions or in pilot plants.

The catalyst is either fed in parallel with the sheath monomer system E1 into the polymerization reactor or is fed into the polymerization reactor before, right before, emulsion polymerization of E1 in step (ii) starts. The water soluble polymerization catalyst is preferably a water-soluble free radical initiator utilized in the aqueous emulsion polymerization. Suitable water-soluble free radical initiators include hydrogen peroxide; tert.-butyl peroxide; diazo initiators like V-50 from Wako Pure Chemical Industries, Ltd.; alkali metal persulfates such as sodium, potassium and lithium persulfate; ammonium persulfate; and mixtures of such initiators with a reducing agent. Reducing agents include: sulfites, such as alkali metal metabisulfite, hydrosulfite, and hyposulfite; sodium formaldehyde sulfoxylate; and reducing sugars such as ascorbic acid and isoascorbic acid.

In step (ii) and/or step (iii) one or more nonionic or anionic emulsifiers, or surfactants, may be used, either alone or together. Examples of suitable nonionic emulsifiers include tert-octylphenoxyethylpoly(39)-ethoxyethanol, dodecyloxypoly(10)ethoxyethanol, nonylphenoxyethylpoly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(I)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate. The one or more surfactants are generally used at a level of from 0 to 3 percent based on the weight of the multi-stage polymer. The one or more surfactants can be added prior to the addition of any monomer charge, during the addition of a monomer charge or a combination thereof. In certain monomer/emulsifier systems for forming the shell, the tendency to produce gum or coagulum in the reaction medium may be reduced or prevented by the addition of about 0.05% to about 2.0% by weight, based on total weight of the shell polymer, of emulsifier without detriment to the deposition of the polymer formed on the previously formed particles.

By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, in some systems the critical micelle concentration of the emulsifier may be exceeded somewhat without the formation of an objectionable or excessive number of dispersed micelles or particles. It is for the purpose of controlling the number of micelles during the various stages of polymerization so that the deposition of the subsequently formed polymer in each stage occurs upon the dispersed micelles or particles formed in the previous stages, that the concentration of emulsifier is kept low.

The viscosity-average molecular weight of the polymer formed in a given stage may range from 100,000, or lower if a chain transfer agent is used, to several million molecular weight. If it is desired to produce a core having a molecular weight in the lower part of the range, such as down to as low as about 20,000, it is frequently most practical to do so by avoiding any polyethylenically unsaturated monomers and using a chain transfer agent instead, such as 0.05% to 2% or more thereof, examples being alkyl mercaptans, such as sec-butyl mercaptan.

The weight ratio of core to the sheath is generally in the range of from 1:0.5 to 1:10, preferably in the range of from 1:1 to 1:5. The weight ratio of core to shell is generally in the range of from 1:5 to 1:20, preferably in the range of from 1:8 to 1:15. Preferably, the weight of the polymeric shell (C) constitutes more than 50% of the total monomer weight of the particles. When trying to decrease the dry density of the final product, is may be preferred to have as little shell as possible while still encapsulating the core.

In order to minimize the dry density of the final product, it is preferable to deposit only as much shell polymer as is needed to fully encapsulate the core. When the hydrophilic core polymer is fully encapsulated, it does not titrate with alkali metal bases under normal analytical conditions of about 1 hour and at room temperature. The extent of encapsulation can be determined by removing samples during the course of the shell polymerization and titrating with sodium hydroxide.

In step (iv) suitable swelling agents include those which, in the presence of the multistage emulsion polymer and monomer, are capable of permeating the shell and swelling the core. Swelling agents may be aqueous or gaseous, volatile or fixed bases or combinations thereof.

Suitable swelling agents in step (iv) of the present disclosure include volatile bases such as ammonia, ammonium hydroxide, preferably aqueous ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. Sodium hydroxide and potassium hydroxide may be chosen in various exemplary embodiments.

The amount of swelling agent can be less than, equal to or greater than the amount needed to provide for complete neutralization of the core. Preferably, the amount of swelling agent is in the range of from 75 to 150 percent, based on the total amount of acid contained in the core plus sheath plus shell, i.e. relative to the core, sheath and shell in total.

Swelling is generally very efficient under conditions of elevated temperature and in the presence of monomer-solvent-system. Under these conditions, swelling is generally complete within 30 minutes, preferably within 20 minutes, most preferably within 10 minutes of adding the one or more swelling agents.

Preferably, the elevated temperature in the neutralization and swelling step (iv) is from about 50° C. to about 120° C., preferably from about 80° C. to about 95° C.

The core polymer of the multistage emulsion polymer swells when the core is subjected to a basic swelling agent that permeates the shell to at least partially neutralize the hydrophilic-functionality of the core, preferably to a pH of at least about 6 to at least about 10, and thereby results in swelling by hydration of the hydrophilic core polymer. The swelling, or expansion, of the core may involve partial merging of the outer periphery of the core into the pores of the inner periphery of the shell and also partial enlargement or bulging of the shell and the entire particle overall.

In accordance with the present disclosure, said swelling takes place in the presence of a monomer-solvent-system comprising from 5-50% by weight, preferably 15-30% by weight, more preferably 20-30% by weight, of the at least one nonionic monoethylenically unsaturated monomer in said shell monomer system (E2), said monomer acting as a solvent, which, in turn, assists in the penetration of the base through the created polymer layers down to the core. Said monomer-solvent-system of step (iv) can be added before, after or during the addition of the base. Preferably, said monomer is styrene.

The presence of said monomer in step (iv) is helpful in facilitating the swelling of the multistage polymer, whether by plasticizing the shell, aiding in the transport through the shell or a combination thereof. However, the presence of monomer is detrimental when trying to maximize swelling and minimize the dry bulk density of the swollen multistage emulsion polymer. Accordingly, and in order to avoid any smell of the final product caused by the presence of said monomer, after swelling the multistage emulsion polymer in the presence of both monomer-solvent system and swelling agent, the level of said monomer of the monomer-solvent system is reduced to less than 10,000 ppm, preferably to less than 5,000 ppm based on polymer solids. This is accomplished by polymerizing the monomer of the monomer-solvent-system used in step (iv). Preferably, in said step (v) of the present disclosure, said monomer-solvent-system is polymerized by redox catalyst initiation after the swelling step is completed. Those redox catalysts are well known in the art. A typically used system is tBHP/SSF. Since the polymerization takes place in the shell, the resulting polymer, preferably polystyrene, becomes a constituent of the shell (C) of the particles.

The process of the present disclosure is capable of producing swollen multi-stage emulsion polymer particles having opacity values as high as those obtained by the process of U.S. Pat. No. 6,020,435, however avoiding the use of intricate, toxic, expensive chemical compounds, in particular not using any polymerization inhibitors or scavengers.

The performance of these swollen multi-stage emulsion polymer particles as opacifyers has been judged as follows: As reference the best (and almost only) product in the market called Ropaque UltraE supplied by Rohm and Haas Company has been taken. A typical acrylic polymer emulsion that produces, upon drying, a clear transparent film has been taken. Always the same amount, solids on solids, of the trial product have been blended therein and the same has been done with the reference product, accounting for any small differences in solids content as to have always the same dry film thickness and the same ratio opacifier-on-polymer on dry bases. Samples are applied on black&white standard Leneta chart. Upon drying (60° C. oven, 20 min) the opacity of the samples has been compared. The reference product is given a value of 10 and no opacity (transparent film) is given a value of 0.

When the swollen multistage emulsion polymers are at least partially dried to produce voided polymer particles, these voided polymer particles impart favorable properties, such as gloss, brightness and opacity to paper coating formulations to which they are added.

The voided polymer particles produced by exemplary methods of the present disclosure may be useful in coating compositions, such as aqueous-based paint and paper coatings. The voided polymer particles produced by exemplary methods of this disclosure may impart improved gloss, brightness and opacity to paper coating formulations to which they are added. Also, the voided polymer particles produced by exemplary methods of this disclosure may impart opacity to aqueous coating compositions, such as paints, to which they are added.

It is understood that all numbers recited herein are modified by the term "about," whether or not so stated.

The following examples are intended to be non-limiting and exemplary only.

EXAMPLE 1

The process was performed as follows: Firstly, reaction water was added into the polymerization reactor which was then heated to 90-92° C. Following this, seed particles were introduced which were prepared by conventional means. These seed particles were composed of 65% by weight methyl methacrylate and 35% by weight methacrylic acid. The mean particle size has been 147 nm, solids content 30%. When adding the seed particles, the temperature decreased to 78-82° C.

Subsequently, feeding of the Preemulsion-I (E1), i.e. the sheath monomer system, was started; in the first 15 minutes the flow rate has been ½ of normal rate (i.e. about 0.5 g/min for 15 min), then normal flow rate during 45 min (i.e. about 1.2 g/min for 45 min). The reaction temperature was between 80-83° C., reaction period: 60 min. The catalyst was co-fed with the sheath monomer system (E1). Both catalysts and E1 finished at the same time. After the feeding was completed, it was waited 15-30 minutes till the temperature was stable at 80-82° C.

Following this, the feeding of the shell monomer system (E2), i.e. Preemulsion-II, was started at 80-82° C. The temperature then gradually increased to 84-85° C., after 10-20 minutes increased to 92-94° C. The reaction period was 70 min. Then, in 15-30 min after E2 was finished, the temperature went down to 88-90° C.

Following this, the Preemulsion-III (E3), i.e. the monomer-solvent-system, was added in 5 minutes. Then it was waited 10 minutes till the temperature was stable at around 85-87° C. Subsequently, the feeding of the neutralizing agent (caustic solution) was started, taking about 60 minutes. The emulsion was kept at 85-89° C. during all the addition. After neutralization, the mixture was kept 15 minutes while mixing. Then, the redox catalyst was added at 84-88° C. (first t-BHP, then SSF). A temperature increase of 5-8° C. to 90-95° C. was observed. After ten minutes the emulsion was cooled down. Below 40° C. a biocide (Acticide® MV commercially available from Thor GmbH) was added. After final work-up, the respective sample was taken out for analytical studies. In the following, the reactor charges for within the individual steps are given:

| Component | Quantity (g) |
|---|---|
| Water | 340.000 |
| Seed (30% solids, particle size 147 nm) | 68.000 |
| Preemulsion-I (E1) | |
| Water | 17.000 |
| Rhodacal DS-10(15%) | 0.500 |
| Methacrylic Acid | 3.000 |
| Methyl Methacrylate | 20.000 |
| Styrene | 20.000 |
| Preemulsion-II: (E2) | |
| Water | 92.000 |
| Rhodacal DS-10 (15%) | 2.670 |
| Methacrylic Acid | 4.000 |
| Styrene | 200.000 |
| Allyl Methacrylate | 0.400 |
| Linseed oil | 1.000 |
| Preemulsion-III (E3) | |
| Water | 16.000 |
| Rhodacal DS-10 (15%) | 0.670 |
| Styrene | 50.000 |
| Catalyst | |
| Sodium Persulfate | 0.800 |
| Water | 24.200 |
| Neutralizing Agent | |
| Sodium Hydroxyde (50%) | 8.800 |
| Water | 167.200 |
| Post treatment | |
| t-Butylhydroxyperoxyde(tBHP) | 0.800 |
| Water | 6.200 |
| Sodium sulfoxylate (SSF) | 0.800 |
| Water | 11.200 |
| Biocide | 1.000 |
| DiW | 2.000 |
| Flush water | 20.00 |
| Total product | 1078 |

The analytical specifications gave the following results:

| Analytical Specifications | | Results |
|---|---|---|
| Aspect: | white opaque emulsion | OK |
| Wet | white | white |
| Dry film | white powder | white powder |
| Solids (%) | 29-31 | 30.6 |
| Viscosity Sp rpm | max 500, LVT 2/60 | 85 |
| pH | 7.5-8.5 | 8.2 |
| Gel, 82 mesh (g/l): | <0.05 | <0.06 |
| Powdering | soft, equal to standard | OK |
| Opacity | equal to standard (10) | 10 |
| Mechanical stability | good | OK |
| Dry density | 0.550-610 g/cm$^3$ | 0.592 |
| Ps (nm) | 380-480 | 444 |

EXAMPLE 2

The process was performed as follows: Firstly, reaction water was added into the polymerization reactor which was then heated to 90-92° C. Following this, the catalyst was added (shot) followed by seed particles prepared by conventional means. These seed particles were composed of 65% by weight methyl methacrylate and 35% by weight methacrylic acid. The mean particle size has been 147 nm, solids content 30%. When adding the seed particles, the temperature decreased to 78-82° C.

Subsequently, feeding of the Preemulsion-I (E1), i.e. the sheath monomer system, was started; in the first 15 minutes the flow rate has been ½ of normal rate (i.e. about 0.5 g/min for 15 min), then normal flow rate during 45 min (i.e. about 1.2 g/min for 45 min). The reaction temperature was between 80-84° C., reaction period: 60 min. After the feeding was completed, it was waited 15-30 minutes till the temperature was stable at 80-82° C.

Following this, the feeding of the shell monomer system (E2), i.e. Preemulsion-II, was started at 80-82° C. The temperature then gradually increased to 84-85° C., after 10-20 minutes increased to 92-94° C. The reaction period was 70 min. Then, in 15-30 min after E2 was finished, the temperature went down to 88-90° C.

Following this, the Preemulsion-III (E3), i.e. the monomer-solvent-system, was added in 5 minutes. Then it was waited 10 minutes till the temperature was stable at around 85-87° C. Subsequently, the feeding of the neutralizing agent (caustic solution) was started, taking about 60 minutes. The emulsion was kept at 85-89° C. during all the addition. After neutralization, the mixture was kept 15 minutes while mixing. Then, the redox catalyst was added at 84-88° C. (first t-BHP, then SSF). A temperature increase of 5-8° C. to 90-95° C. was observed. After ten minutes the emulsion was cooled down. Below 40° C. a biocide (Acticide® MV commercially available from Thor GmbH) was added. After final work-up, the respective sample was taken out for analytical studies. In the following, the reactor charges for within the individual steps are given:

| Component | Quantity |
|---|---|
| Water | 340.000 |
| Seed (30% solids, particle size 147 nm) | 68.000 |
| Preemulsion-I (E1) | |
| Water | 17.000 |
| Rhodacal DS-10(15%) | 0.500 |
| Methacrylic Acid | 3.000 |
| Methyl Methacrylate | 20.000 |
| Styrene | 20.000 |
| Preemulsion-II: (E2) | |
| Water | 92.000 |
| Rhodacal DS-10 (15%) | 2.670 |
| Methacrylic Acid | 4.000 |
| Styrene | 200.000 |
| Allyl Methacrylate | 0.400 |
| Linseed oil | 1.000 |
| Preemulsion-III (E3) | |
| Water | 16.000 |
| Rhodacal DS-10 (15%) | 0.670 |
| Styrene | 50.000 |
| Catalyst | |
| Sodium Persulfate | 1.00 |
| Water | 24.200 |
| Neutralizing Agent | |
| Sodium Hydroxyde (50%) | 8.800 |
| Water | 167.200 |
| Post treatment | |
| t-Butylhydroxyperoxyde(tBHP) | 0.800 |
| Water | 6.200 |
| Sodium sulfoxylate (SSF) | 0.800 |
| Water | 11.200 |
| Biocide | 1.000 |
| DiW | 2.000 |
| Flush water | 20.00 |
| Total product | 1078 |

The analytical specifications gave the following results:

| Analytical Specifications | | Results |
|---|---|---|
| Aspect: | white opaque emulsion | OK |
| Wet | white | white |
| Dry film | white powder | white powder |
| Solids (%) | 29-31 | 30 |
| Viscosity Sp rpm | max 500, LVT 2/60 | 50 |
| pH | 7.5-8.5 | 8.2 |
| Gel, 82 mesh (g/l): | <0.05 | <0.05 |
| Powdering | soft, equal to standard | OK |
| Opacity | equal to standard (10) | 10 |
| Mechanical stability | good | OK |
| Dry density | 0.550-610 g/cm$^3$ | 0.573 |
| Ps (nm) | 380-480 | 436 |

EXAMPLE 3

As in Example 1, where catalyst is fed with E1, no other catalyst, no inhibitors. Trials T-340, T-325, T-328 and T-329 contain, respectively 1.2 g, 1.0 g, 0.8 g and 0.6 g of catalyst (corresponding to 0.5%, 0.42%, 0.33%, 0.25% based on E1+E2 monomers). The resulting opacities are, respectively: 6; 9; 10; 10.

EXAMPLE 4

As in Example 2, where catalyst is shot right before E1, no other catalysts, no inhibitors. Trials T-338, T-333, T-327, T-336 contain same gradation of catalyst as in Example 1 (corresponding to 0.5%, 0.42%, 0.33%, 0.25% based on E1+E2 monomers). The resulting opacities are 6.5; 9.5; 10; 10.

COMPARATIVE EXAMPLE 1

In the same recipe given in Example 2, apart from the existing catalyst (0.42% shot right before E1) a second catalyst (Catalyst-2, 0.13% based on E1+E2 monomers) has been added, which has been dosed parallel with E2. When E2 and Catalyst-2 are finished, 0.5 g (or 1.15%) of the inhibitor 4-Hydroxy Tempo are added in E3. Remaining part of the reaction is the same as in Example 2. The results are that the reference commercial product, this Comparative Example 1, inventive Example 1 and inventive Example 2 show the same opacity, all of them ranging at 9.5-10.

COMPARATIVE EXAMPLE 2

Examples 2A and 2B of U.S. Pat. No. 4,594,363 have been reproduced. These reactions were carried as close to an exact reproduction as technically possible, using same raw materials and processes. Both reactions run smoothly, showing neither physical nor chemical problems. Resulting products were as expected in terms of solids %, pH, viscosity, absence of coagulum, etc. The opacity values obtained were, in the scale from 0 to 10 explained above, approximately 1.5 and 1.0 respectively. Even allowing for small differences in materials and processing, the differences in opacity compared to the above inventive Examples 1 and 2 are significant.

Inventive Examples 1 and 2 are identical in every aspect, except for the catalyst. In Example 1 (Trial 363), the catalyst is fed in parallel with E1 and both feeds end up at the same time. In Example 2 (Trial 333), the catalyst is shot in the reactor right before E1 starts. Neither there are added further catalysts, nor inhibitors nor scavengers to disturb the process in any way. In both Example 1 and Example 2 the amount of catalyst referred to monomers to be polymerized (monomers in E1+monomers in E2) is equal or lower than 0.45%, actually 0.33% and 0.42 respectively. In this context, it should be noted that Examples 1 and 2 represent processes carried out under laboratory conditions (adopted for charges of 1 to 5 kg) similar to those of pilot plant conditions adopted for charges of 100 kg to 2000 kg. However, as mentioned above, when performing the process of the present disclosure on an industrial scale, i.e. in reactors with capacities of about 10 000 to 50 000 kg, preferably, the water soluble polymerization catalyst is used in a total amount of 0.10 to 0.30 by weight, based on the total amount of monomers in E1 plus E2. Thus, this does mean that Examples 1 and 2 are outside the exemplary range for the total catalyst amount.

The obtained products exhibit opacity values of 10. The product of Comparative Example 1 exhibits opacity values as good as those of inventive Examples 1 and 2, however using much higher catalyst amount and unwanted polymerization inhibitor.

According to the present disclosure, no catalyst with E2 is used, and the total amount of catalyst has to be equal or lower than 0.45%. By doing it this way, no sophisticated polymerization inhibitors are needed at all, which results in a simpler, cleaner and cheaper product and process, avoiding any undesired manual operations of preparing fresh polymerization inhibitors solutions.

The invention claimed is:

1. A process for preparing an emulsion containing core-sheath-shell polymer particles, said process comprising the steps of:
   (i) emulsion polymerizing a core (A) from a core monomer system comprising, as polymerized units, from about 5% to about 100by weight, based on the weight of the core, of hydrophilic monoethylenically unsaturated monomer containing acid functionality, and from about 0 to about 95% by weight, based on the weight of the core, of at least one nonionic monoethylenically unsaturated monomer;
   (ii) encapsulating said core (A) with a sheath polymeric layer (B) by emulsion polymerizing a sheath monomer system (E1) comprising, as polymerized units, at least about 20% by weight of a hydrophilic monoethylenically unsaturated monomer, at least about 40% by weight of a hydrophobic monoethylenically unsaturated monomer, and about 1% to about 20% by weight of a hydrophilic monoethylenically unsaturated monomer containing acid functionality, each based on the total weight of the sheath polymeric layer, in the presence of said core, said sheath permitting penetration of volatile, fixed or permanent bases;
   (iii) encapsulating said core-sheath particles with a polymeric shell (C) by emulsion polymerizing a shell monomer system (E2) comprising, as polymerized units, from about 1% to about 10% by weight, of hydrophilic monoethylenically unsaturated monomer containing acid functionality, and from about 90% to about 99% by weight, of at least one nonionic monoethylenically unsaturated monomer, each based on the total weight of the polymeric shell;
   (iv) neutralizing and swelling the resultant core-sheath-shell polymer particles with a volatile, fixed or permanent base, said swelling taking place in the presence of a monomer-solvent-system comprising from about 5% to about 50by weight of the at least one nonionic monoethylenically unsaturated monomer of said shell monomer system (E2), wherein said monomer-solvent-system is added before, after, or during the addition of the base, wherein the shell monomer system (E2) is polymerized to at least 90% before step (iv) is started, and
   (v) after the swelling step, reducing the level of said at least one nonionic monoethylenically unsaturated monomer of said monomer-solvent-system in step (iv) by polymerizing the monomer to less than about 10,000 ppm, based on polymer solids, so as to produce an emulsion of particles which, when dried, contain a microvoid which causes opacity in compositions in which they are contained,
   wherein a water soluble polymerization catalyst in a total amount of about 0.05% to about 0.45% by weight, based on the total amount of monomers in E1 and E2, is either fed in parallel with the sheath monomer system E1 into the polymerization reactor or is fed into the polymerization reactor before emulsion polymerization of E1 in step (ii) starts, and the process is free of the addition of a polymerization inhibitor or scavenger.

2. The process of claim 1, wherein the total amount of polymerization catalyst ranges from about 0.1% to about 0.30% by weight, based on the total amount of monomers in E1 and E2.

3. The process of claim 1, wherein in step (iv) the monomer-solvent-system comprises from about 15 to about 30% by weight of the at least one nonionic monoethylenically unsaturated monomer.

4. The process of claim 1, wherein said core (A) is polymerized from a core monomer system comprising about 30% to about 40% by weight (meth)acrylic acid and about 60 to about 70% by weight methyl (meth)acrylate.

5. The process of claim 1, wherein said sheath polymeric layer (B) is polymerized from a sheath monomer system (E1) comprising at least about 40% by weight of styrene, at least 40% by weight of methyl (meth)acrylate, and about 1% to about 20% by weight of (meth)acrylic acid.

6. The process of claim 1, wherein the sheath monomer system (E1) is polymerized to at least about 90% before the shell monomer system (E2) begins to be polymerized.

7. The process of claim 1, wherein the total amount of sheath polymeric layer (B) ranges from about 1 to about 5 times the weight of the core.

8. The process of claim 1, wherein the shell monomer system (E2) comprises, as polymerized units, from about 1% to about 10% by weight of (meth)acrylic acid, and from about 90% to about 99% by weight of styrene.

9. The process of claim 1, wherein the weight of said polymeric shell (C) constitutes more than about 50% of the total monomer weight of the particles.

10. The process of claim 1, wherein the volatile, fixed or permanent base is chosen from one or more of ammonia, amines, potassium hydroxide, lithium hydroxide, sodium hydroxide, calcium hydroxide, sodium carbonate, sodium silicate, and transition metal amino compounds.

11. The process of claim 1, wherein the temperature in the neutralization and swelling step (iv) range from about 50° C. to about 120° C.

12. The process of claim 11, wherein the temperature in the neutralization and swelling step (iv) range from about 80° C. to about 95° C.

13. The process of claim 1, wherein said at least one nonionic monoethylenically unsaturated monomer of said monomer-solvent-system in step (iv) is styrene.

14. The process of claim 1, wherein in step (v) said monomer-solvent-system is polymerized by redox catalyst initiation after the swelling step is completed.

15. The process of claim 1, further comprising at least partially drying the emulsion.

16. A process for preparing an emulsion containing core-sheath-shell polymer particles, said process comprising the steps of:
   (i) emulsion polymerizing a core (A) from a core monomer system comprising, as polymerized units, from about 5% to about 100% by weight, based on the weight of the core, of hydrophilic monoethylenically unsaturated monomer containing acid functionality, and from about 0 to about 95% by weight, based on the weight of the core, of at least one nonionic monoethylenically unsaturated monomer;
   (ii) encapsulating said core (A) with a sheath polymeric layer (B) by emulsion polymerizing a sheath monomer system (E1) comprising, as polymerized units, at least about 20% by weight of a hydrophilic monoethylenically unsaturated monomer, at least about 20% by weight of a hydrophobic monoethylenically unsaturated monomer, and about 1% to about 20% by weight of a hydrophilic monoethylenically unsaturated monomer containing acid functionality, each based on the total weight of the sheath polymeric layer, in the presence of said core, said sheath permitting penetration of volatile, fixed or permanent bases;
   (iii) encapsulating said core-sheath particles with a polymeric shell (C) by emulsion polymerizing a shell monomer system (E2) comprising, as polymerized units, from about 1% to about 10% by weight, of hydrophilic monoethylenically unsaturated monomer containing acid functionality, and from about 90% to about 99% by weight, of at least one nonionic monoethylenically unsaturated monomer, each based on the total weight of the polymeric shell;
   (iv) neutralizing and swelling the resultant core-sheath-shell polymer particles with a volatile, fixed or permanent base, said swelling taking place in the presence of a monomer-solvent-system comprising from about 5% to about 50% by weight of the at least one nonionic monoethylenically unsaturated monomer of said shell monomer system (E2), wherein said monomer-solvent-system is added before, after, or during the addition of the base, wherein the shell monomer system (E2) is polymerized to about 90% before step (iv) is started; and
   (v) after the swelling step, reducing the level of said at least one nonionic monoethylenically unsaturated monomer of said monomer-solvent-system in step (iv) by polymerizing the monomer to less than about 10,000 ppm, based on polymer solids, so as to produce an emulsion of particles which, when dried, contain a microvoid which causes opacity in compositions in which they are contained,
   wherein a water soluble polymerization catalyst in a total amount of about 0.05% to about 0.45% by weight, based on the total amount of monomers in E1 and E2, is either fed in parallel with the sheath monomer system E1 into the polymerization reactor or is fed into the polymerization reactor before emulsion polymerization of E1 in step (ii) starts, and the process is free of the addition of a polymerization inhibitor, a scavenger, and alpha methyl styrene.

\* \* \* \* \*